United States Patent
Chen

(10) Patent No.: US 7,249,482 B2
(45) Date of Patent: Jul. 31, 2007

(54) ELECTRODE TEXTURING TOOL AND METHOD OF USE THEREOF

(75) Inventor: Yen-Lung Chen, Troy, MI (US)

(73) Assignee: General Motors Corporation, Detroit, MI (US)

( * ) Notice: Subject to any disclaimer, the term of this patent is extended or adjusted under 35 U.S.C. 154(b) by 368 days.

(21) Appl. No.: 10/806,676

(22) Filed: Mar. 23, 2004

(65) Prior Publication Data

US 2005/0211677 A1    Sep. 29, 2005

(51) Int. Cl.
*B21C 37/29* (2006.01)
*B21C 1/00* (2006.01)
*B23K 9/24* (2006.01)

(52) U.S. Cl. ............... 72/71; 72/703; 219/119

(58) Field of Classification Search ............ 72/71, 72/325, 476, 703; 83/886–887; 101/19, 101/30; 219/117.1, 119
See application file for complete search history.

(56) References Cited

U.S. PATENT DOCUMENTS

| | | | |
|---|---|---|---|
| 1,052,193 A | * | 2/1913 | Vogt ..................... 72/476 |
| 3,278,720 A | | 10/1966 | Dixon ................... 219/118 |
| 3,304,857 A | * | 2/1967 | Schmidt, III ............ 101/30 |
| 4,972,047 A | | 11/1990 | Puddle et al. ............ 219/118 |

FOREIGN PATENT DOCUMENTS

GB    1 554 297    10/1979

OTHER PUBLICATIONS

"Guidelines to Resistance Spot Welding Aluminum Automotive Sheet". *The Aluminum Association*. T10. pp. 7-8.

* cited by examiner

*Primary Examiner*—Derris H. Banks
*Assistant Examiner*—Teresa M. Bonk

(57) ABSTRACT

An article for texturing an electrode having a tip hardness and a tip contour is disclosed. The article includes a plate having an upper surface and a lower surface, and an indentation in at least one of the upper and the lower surface. The indentation includes a textured surface having a plurality of asperities. The textured surface has a hardness greater than the tip hardness of the electrode. The texture of the textured surface is imprinted into the tip of the electrode in response to the tip of the electrode and the textured surface being pressed against each other.

24 Claims, 2 Drawing Sheets

ELECTRODE TEXTURING TOOL AND METHOD OF USE THEREOF

BACKGROUND OF THE INVENTION

The present disclosure relates generally to an electrode-texturing tool and a method of use thereof, and particularly to an electrode-texturing tool for creating a textured surface at the tip of an electrode.

In resistance spot welding, pressure is applied to two or more contacting metal sheets by means of copper or copper alloy electrodes, while simultaneously passing a high electric current between the electrodes. Electrical heating causes a molten nugget to form at the sheet interface at the point of pressure. Resistance spot welding is one of the most useful and economical methods to join sheet metal components. For mass production, such as in the manufacture of automotive bodies, electrode life and equipment downtime to replace worn out electrodes is a consideration.

An aspect of resistance spot welding is the electrical resistance between the electrodes and the workpiece (electrode resistance), and between the contacting metal sheets that make up the workpiece (faying surface resistance). In the resulting series arrangement of resistances, it is desirable for the faying surface resistance to be a substantial part of the total resistance (electrode plus faying surface resistance). However, variations at the electrode-to-workpiece interface may cause the electrode resistance to vary, and in some instances to exceed a preferred level. Such variations may result from an oxide layer being present on the workpiece surface that increases the contact resistance at the electrode-to-workpiece interface. As the electrode-to-workpiece contact resistance increases, so does the heat generation in that vicinity, which may result in electrode wear at the electrode tip over time, and variations in the quality of the weld. Furthermore, the inconsistency in the nature of the surface oxide films, particularly with aluminum and magnesium alloys, can make the electrode resistance variable, resulting in erratic weld quality.

Low electrode resistance on aluminum alloy surfaces may be obtainable with abrasion or arc cleaning of the outer surfaces of the workpiece. Alternatively, the surface of the spot welding electrode may be roughened by sand-blasting or shot-peening. The sharp asperities on the roughened electrode surface can break through the insulating layers on the surface of workpiece and make direct contact with the underlying fresh metal, thus reduce the contact resistance between the electrode and the workpiece (electrode resistance) and increase the service life of the welding electrode. An added benefit of roughened electrodes is the elimination or reduction of electrode skidding.

A spot welding electrode will deteriorate over time with use, and especially quickly for welding aluminum or magnesium due to the high currents used and the metallurgical interactions between aluminum or magnesium sheet and the copper electrodes. A worn electrode must be either dressed by re-cutting the welding surface, or exchanged with a new electrode to maintain weld quality. For aluminum or magnesium alloys, this redressing is often done after only a few tens of welds. Textured or roughened electrodes improve the spot welding process significantly as mentioned above. However, the textured surface will be lost after electrode dressing.

If surface roughening is done by a method like sand-or grit-blasting, the electrode must be removed from the welding machine and the electrode tip surface roughened at a separate location, which may significantly and negatively impact the productivity. Accordingly, there is a need for an electrode texturing or roughening tool and method of use thereof that overcomes these drawbacks.

SUMMARY OF THE INVENTION

Embodiments disclose an article for texturing an electrode having a tip hardness and a tip contour. The article includes a plate having an upper surface and a lower surface, and an indentation in at least one of the upper and the lower surface. The indentation includes a textured surface having a plurality of asperities. The textured surface has a hardness greater than the tip hardness of the electrode. The texture of the textured surface is imprinted into the tip of the electrode in response to the tip of the electrode and the textured surface being pressed against each other.

Additional embodiments disclose a method for texturing an electrode having a tip hardness and a tip contour. A tool is placed between a first electrode and a stop surface. The tool has an upper surface and a lower surface, and an indentation being in at least one of the upper and the lower surface. The indentation has a textured surface comprising a plurality of asperities. The textured surface has a hardness greater than the tip hardness of the first electrode. The first electrode is pressed against the tool such that the tip of the first electrode is pressed against the textured surface of the tool, thereby imprinting the texture of the textured surface into the tip of the first electrode. Upon completion of the texturing, the pressing action is reversed and the tool is removed from between the first electrode and the stop surface.

Embodiments further disclose a method of roughening an electrode having a tip hardness and a tip contour. A tool is placed between a first electrode and a stop surface. The tool has an upper surface and a lower surface, and an indentation being in at least one of the upper and the lower surface. The indentation has a textured surface comprising a plurality of asperities. The textured surface has a hardness greater than the tip hardness of the first electrode. The first electrode is pressed against the tool such that the tip of the first electrode is pressed against the textured surface of the tool, and the tool rotated about the axis of the first electrode, thereby roughening the surface of the tip of the first electrode. Upon completion of the roughening, the pressing action is reversed and the tool is removed from between the first electrode and the stop surface.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention provide a tool for texturing or roughening the tip of an electrode of a welding machine, and a method of use thereof. The texturing or roughening of the electrode with the tool may be accomplished without disassembling the electrode from the welding machine. The tool may be configured to texture or roughen a single electrode or a pair of opposing electrodes. Embodiments of the invention may be used for imprinting a texture onto the surface, or roughening the surface, of a new electrode or a dressed electrode. Texture imprinting, or electrode tip roughening, may be done manually or automatically in a production line, and may include a compression technique or a combination of compression and rotation techniques. While the embodiments described herein depict a circular plan view for the outside geometry of an exemplary tool, it will be appreciated that the disclosed invention is also applicable to other shapes, such as a rectangular shape for example. As used herein, the term texturing is understood to encompass the meaning of the term roughening.

Figure 1:
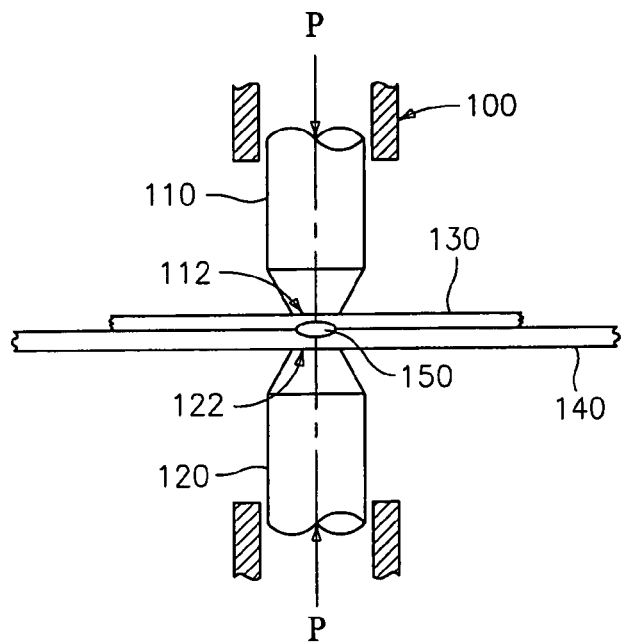
FIG. 1 depicts an exemplary embodiment of a welding machine for use in accordance with embodiments of the invention.

FIG. 1 is an exemplary embodiment of a welding machine 100, with detail removed for clarity, having an upper electrode 110 and a lower electrode 120. Each electrode 110, 120 has an electrode tip 112, 122, respectively, that press against metal parts 130, 140, under an appropriate load P, during resistance spot welding. During welding, a sufficient amount of electrical current passes between electrodes 110, 120 and across the interface of metal parts 130, 140 to produce a weld nugget 150 of a specified size. Each electrode tip 112, 122 may have a specified hardness and contour that are designed for a particular weld setup. The details of operating a resistance spot welding machine are well known to one skilled in the art and are therefore not presented herein.

As an aid to the welding process, it is preferable that tips 112, 122 of electrodes 110, 120 have a textured or roughened surface sufficient and suitable to penetrate an oxide layer on a surface of metal parts 130, 140 in response to tips 112, 122 being pressed against metal parts 130, 140. Such a textured or roughened surface may include a plurality of sharp asperities, and while applicants do not wish to be bound by any particular theory, the asperities are contemplated to be sharp enough to break through an insulating layer, such as an oxide layer for example, on the surface of metal parts 130, 140, so as to reduce the contact resistance by creating more contact points for current flow between electrodes 110, 120 and the outer surfaces of metal parts 130, 140. The additional contact points also provide a mechanical interference between electrodes 110, 120 and metal parts 130, 140 to eliminate or reduce electrode skidding. During welding, electrode tip wear is common and may necessitate periodic redressing of electrode tips 112, 122, which will now be discussed in more detail.

Figure 2:
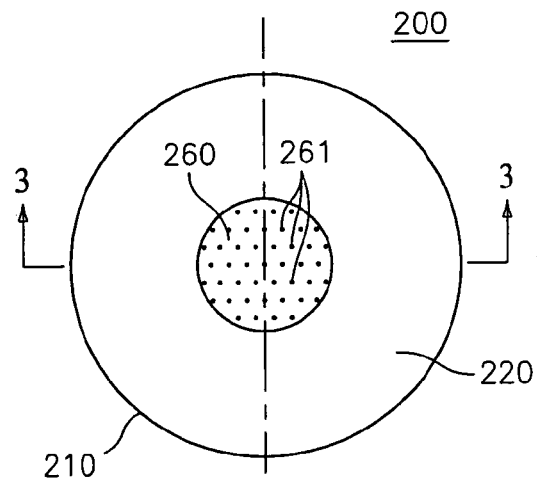
FIG. 2 depicts a plan view of an exemplary embodiment of a tool in accordance with embodiments of the invention.
Figure 3:
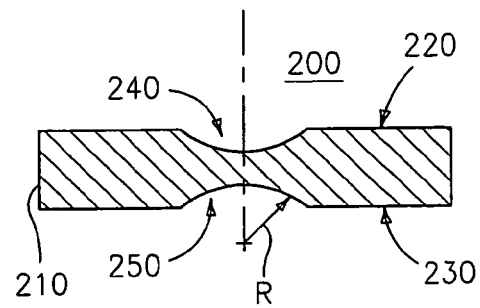
FIG. 3 depicts a cross-section view through the center of the tool of FIG. 2 illustrating an exemplary thickness profile thereof.

Reference is now made to FIGS. 2 and 3, where FIG. 2 is a plan view of a tool 200 and FIG. 3 is a cross-section view through the center of tool 200 showing an exemplary thickness profile thereof. Tool 200 is made from a plate 210 having an upper surface 220 and a lower surface 230, where each surface 220, 230 has an indentation 240, 250 therein. Tool 200 may be configured with one indentation 240 in upper surface 220, one indentation 250 in lower surface 230, or indentations 240, 250 in each of upper and lower surfaces 220, 230, depending on whether the tool is to be used for texturing or roughening one electrode 110 or 120, or two opposing electrodes 110 and 120. When two opposing electrodes 110, 120 are being textured or roughened, they may be done simultaneously.

Each indentation 240, 250 has a textured surface 260, which is shown only in FIG. 2 but is considered representative of a textured surface at both indentations 240, 250. Textured surfaces 260 are formed having a plurality of asperities, depicted as dots 261 at textured surface 260 in FIG. 2, and a hardness that is greater than the tip hardness of electrodes 110, 120. In an embodiment, the texturing of textured surface 260 provides a surface roughness having an average roughness depth of equal to or greater than about 10 microns and equal to or less than about 50 microns. However, other average roughness depths may be suitable for purposes disclosed herein, such as an average roughness depth equal to or less than about 100 microns, for example. In an embodiment, tool 200 is made of hardened steel. Indentations 240, 250 and textured surfaces 260 also have contours that mirror the tip contours of the respective electrodes 110, 120. As used herein, the term mirror refers to one contour being a faithful representation of another contour. In an embodiment, each contour of textured surfaces 260 has a radius of curvature R that is equal to or greater than a corresponding radius of curvature at each respective tip 112, 122 of each respective electrode 110, 120. In an embodiment, the contours of textured surfaces 260 are spherical, but are not limited to spherical. For example, the contours of textured surfaces 260 may be a spherical shape having a flat base. In alternative embodiments, the contours of textured surfaces 260 may be the same or different, depending on the contours of the respective electrode tips 112, 122.

Figure 4:
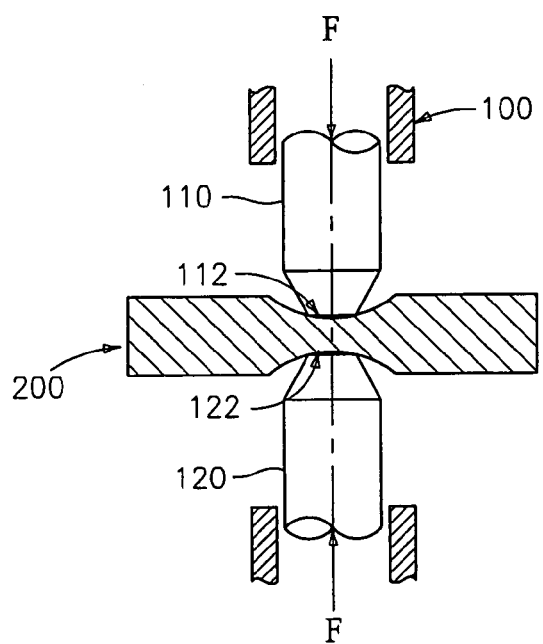
FIG. 4 depicts an exemplary use of the tool of FIGS. 2 and 3 in the welding machine of FIG. 1.

Referring now to FIG. 4, which depicts welding machine 100 with electrodes 110, 120 pressed against tool 200, the texture of textured surfaces 260 may be imprinted into tips 112, 122 in response to each tip 112, 122 and each textured surface 260 being pressed against each other under an appropriate load F, where the harder surfaces of tool 200 cause the asperities of tool 200 to be driven into the tips of electrodes 110, 120, thereby producing asperities thereon. In an embodiment, tool 200 is sized for imprinting a texture into tips 112, 122 absent the removal of electrodes 110, 120 from welding machine 100. However, tool 200 may also be used for texturing or roughening tips 112, 122 where electrodes 110, 120 have been removed from welding machine 100.

In view of the foregoing, tool 200 may be used to texture tips 112, 122 of electrodes 110, 120 by placing tool 200 between first and second electrodes 110, 120, and pressing electrodes 110, 120 against tool 200 with sufficient force F such that the texture of textured surfaces 260 is imprinted into tips 112, 122. A stop surface may be used in place of second electrode 120 if only first electrode 110 needs texturing, and vice-versa with respect to texturing only second electrode 120. On completion of the texturing procedure, the pressing action of welding machine 100 is reversed, and tool 200 is removed from between electrodes 110 and 120. As discussed previously, the method of texturing tips 112, 122 may be accomplished simultaneously and without having to remove electrodes 110, 120 from welding machine 100.

Tool 200 may be used by an operator for manual texturing, or in a setup containing tool 200 for automatic texturing in the case of robotic spot welding. For example, in robotic welding, electrodes 110 and 120 are brought to tool 200 and the texturing operation of electrode tips 112 and 122 is done in the same way as described previously.

Figure 5:
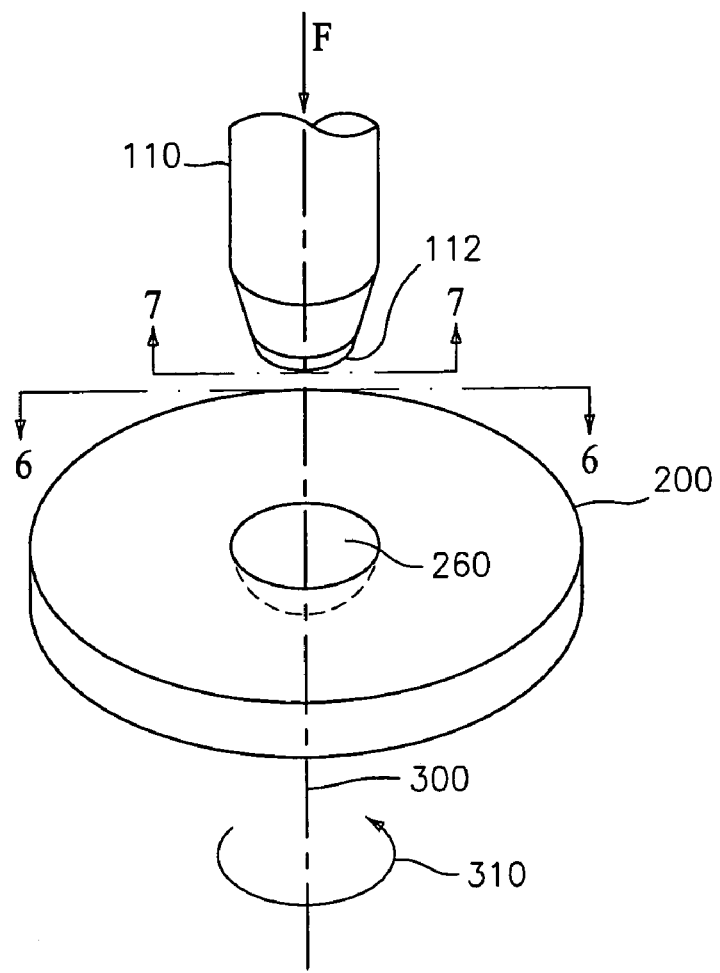
FIG. 5 depicts an isometric view of an arrangement similar to that depicted in FIG. 4 in accordance with embodiments of the invention.
Figure 6:
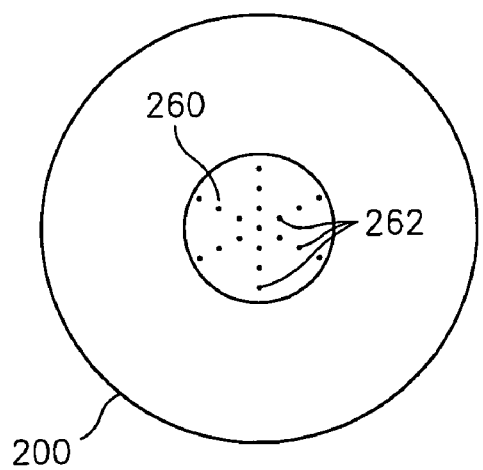
FIG. 6 depicts a plan view of an alternative embodiment of the tool depicted in FIG. 2.
Figure 7:
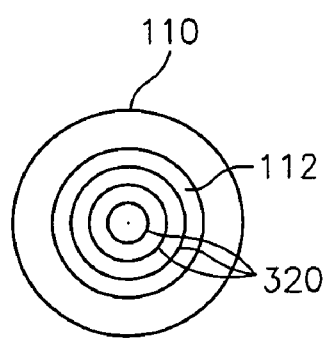
FIG. 7 depicts a bottom view of an electrode tip in accordance with embodiments of the invention.

In an alternative embodiment, texturing or roughening electrode tips 112 and 122 may be achieved by rotating tool 200 about the axis 300 of electrodes 110, 120 and tool 200 under load F, as best seen by now referring to FIG. 5. While only one electrode 110 is depicted in FIG. 5, it will be appreciated that two electrodes 110, 120, as discussed previously, may be textured in a manner now to be described in more detail. By rotating tool 200 about axis 300, as depicted by arrow 310, under load F, many concentric rings of asperities are created on the electrode tips 112 and 122. Where the textured surface 260 of tool 200 includes a random arrangement of asperities, as depicted by the dots 261 in FIG. 2, so the texturing of electrode tips 112, 122 will include a random arrangement of concentric circles. However, where the textured surface 260 of tool 200 includes a defined arrangement of asperities, as depicted by the star arrangement of dots 262 in FIG. 6, a rotation of tool 200, in the manner discussed previously, will produce a defined arrangement of concentric circles 320 on electrode tips 112, 122, as depicted in FIG. 7 (only electrode tip 112 with concentric circles 320 depicted). Where there are three dots 262 at a defined distance from the center of surface 260 on each leg of the star arrangement, as depicted in FIG. 6, there will be three circular indentations formed on electrode tip 112, depicted as concentric circles 320 in FIG. 7, with the space between the indentations forming sharp ridges, thereby providing a texture at electrode tip 112 suitable for penetrating an oxide layer on a surface of a metal part undergoing resistance spot welding. While only six legs of a star arrangement and only three asperities (dots 262) per star leg are depicted in FIG. 6, resulting in only three concentric circles 320 on electrode tip 112 as depicted in FIG. 7, it will be appreciated that any number of asperities in any arrangement may be used in accordance with the teaching of the invention disclosed herein for the purpose disclosed herein. While not being held to any particular theory, it is contemplated that the presence of concentric circular ridges on electrode tips 112, 122 may assist in more uniformly distributing the electrical current about the center of the weld site during resistance spot welding. As electrode tips 112 and 122 are worn down over time, they may be re-cut using a commercially available tip dresser, and then re-textured or roughened using embodiments of tool 200 and embodiments of methods disclosed herein.

As disclosed, some embodiments of the invention may include some of the following advantages: the ability to texture or roughen electrode tips without having to remove the electrodes from the welding machine; the ability to texture or roughen a single electrode tip, or a pair of electrode tips simultaneously; the ability to maintain improved electrical contact between the electrodes and the workpieces for improved consistency of welding; the ability to increase the service life of the welding eletrode; the ability to maintain improved mechanical interaction between the electrodes and the workpieces for reducing electrode skidding during welding; the ability to maintain a high degree of weld quality with substantially reduced down-time of the welding machine; the ability to texture or roughen electrodes either manually or robotically; and, a more uniform distribution of electrical current about the center of the weld site during resistance spot welding.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An article for texturing an electrode having a tip hardness and a tip contour, the article comprising:
   a plate having an upper surface and a lower surface; and
   an indentation in at least one of the upper and the lower surface, the indentation having a textured surface comprising a plurality of asperities, the textured surface having a hardness greater than the tip hardness of the electrode;
   wherein the texture of the textured surface is imprinted into the tip of the electrode in response to the tip of the electrode and the textured surface being pressed against each other;
   wherein each of the plurality of asperities are disposed at the textured surface so as to traverse concentric circular paths in response to rotation of the plate about an axis perpendicular to the plate.

2. The article of claim 1, wherein the textured surfhce has a contour that mirrors the tip contour of the electrode.

3. The article of claim 2, wherein the contour of the textured surface has a radius that is equal to or greater than a corresponding radius of the tip of the electrode.

4. The article of claim 3, wherein the contour of the textured surface is spherical.

5. The article of claim 1, wherein:
   the plurality of asperities at the textured surface produce a plurality of sharp asperities at the tip of the electrode suitable to penetrate an oxide layer on a surface of a metal part in response to the tip of the electrode and the surface of the metal part being pressed against each other; and
   the plurality of asperities at the textured surface has an average roughness depth of equal to or greater than about 10 microns and equal to or less than about 100 microns.

6. The article of claim 5, wherein the plurality of asperities at the textured surface has an average roughness depth of equal to or greater than about 10 microns and equal to or less than about 50 microns.

7. The article of claim 1, wherein the plate is so dimensioned as to be insertable through a space defined by a retracted position of the electrode in the welding device for imprinting a texture into the tip of the electrode absent removal of the electrode from the welding device in which the electrode is installed.

8. The article of claim 1, wherein the indentation is in each of the upper surface and the lower surface, the indentation in the upper surface for texturing an upper electrode and the indentation in the lower surface for simultaneously texturing a lower electrode.

9. A method of texturing an electrode having a tip hardness and a tip contour, the method comprising:

placing a tool between a first electrode and a stop surface, the tool having an upper surface and a lower surface, an indentation being in at least one of the upper and the lower surface, the indentation having a textured surface comprising a plurality of asperities, the textured surface having a hardness greater than the tip hardness of the first electrode;

pressing the first electrode against the tool such that the tip of the first electrode is pressed against the textured surface of the tool, thereby imprinting the texture of the textured surface into the tip of the first electrode; and reversing the pressing action and removing the tool from between the first electrode and the stop surface.

10. The method of claim 9, wherein the indentation has a contour that mirrors the tip contour of the first electrode.

11. The method of claim 10, wherein the imprinting further comprises imprinting a spherical texture from the tool to the tip of the first electrode.

12. The method of claim 10, wherein the imprinting further comprises imprinting a plurality of sharp asperities from the tool to the tip of the first electrode, the sharp asperities being suitable to penetrate an oxide layer on a surface of a metal part in response to the tip of the first electrode and the surface of the metal part being pressed against each other.

13. The method of claim 9, wherein the first electrode is installed in a welding device, and further comprising placing the tool between the first electrode and the stop surface without removing the first electrode from the welding device.

14. The method of claim 13, wherein:
the stop surface comprises a second electrode having a tip hardness and a tip contour, the upper surface comprises a first indentation having a textured surface, the lower surface comprises a second indentation having a textured surface, the first indentation has a contour that minors the tip contour of the second electrode; and
the pressing the electrode against the tool comprises pressing the first electrode against the textured surface of the first indentation while simultaneously pressing the second electrode against the textured surface of the second indentation, thereby simultaneously imprinting a textured surface into the tips of each of the first electrode and the second electrode.

15. The method of claim 14, wherein the contours of the first and the second textured surfaces are the same.

16. The method of claim 14, wherein the contours of the first and the second textured surfaces are different.

17. A method of roughening an electrode having a tip hardness and a tip contour by using the article of claim 1, the method comprising:
placing a tool between a first electrode and a stop surface, the tool having an upper surface and a lower surface, an indentation being in at least one of the upper and the lower surface, the indentation having a textured surface comprising a plurality of asperities, the textured surface having a hardness greater than the tip hardness of the first electrode;

pressing the first electrode against the tool such that the tip of the first electrode is pressed against the textured surface of the tool;

rotating the tool about the axis of the first electrode, thereby roughening the surface of the tip of the first electrode; and reversing the pressing action and removing the tool from between the first electrode and the stop surface.

18. The method of claim 17, wherein the indentation has a contour that mirrors the tip contour of the first electrode.

19. The method of claim 18, wherein the roughening further comprises imparting a spherical surface contour from the tool to the tip of the first electrode.

20. The method of claim 18, wherein the roughening further comprises creating a plurality of concentric rings of sharp asperities on the tip of the first electrode, the sharp asperities being suitable to penetrate an oxide layer on a surface of a metal part in response to the tip of the first electrode and the surface of the metal part being pressed against each other.

21. The method of claim 17, wherein the first electrode is installed in a welding device, and further comprising placing the tool between the first electrode and the stop surface without removing the first electrode from the welding device.

22. The method of claim 21, wherein:
the stop surface comprises a second electrode having a tip hardness and a tip contour, the upper surface comprises a first indentation having a textured surface, the lower surface comprises a second indentation having a textured surface, the first indentation has a contour that mirrors the tip contour of the first electrode, the second indentation has a contour that mirrors the tip contour of the second electrode; and
the pressing the electrode against the tool comprises pressing the first electrode against the textured surface of the first indentation while simultaneously pressing the second electrode against the textured surface of the second indentation, thereby simultaneously creating a roughened surface on the tips of each of the first electrode and the second electrode.

23. The method of claim 22, wherein the contours of the first and the second textured surfaces are the same.

24. The method of claim 22, wherein the contours of the first and the second textured surfaces are different.

* * * * *